United States Patent [19]

O'Hanlon

[11] 4,289,115
[45] Sep. 15, 1981

[54] HEATING AND COOLING OF A HEAVILY INSULATED BUILDING THROUGH THE USE ONLY OF SOLAR ENERGY

[76] Inventor: Edward J. O'Hanlon, Assembly Point, Lake George, N.Y. 12845

[21] Appl. No.: 35,973

[22] Filed: May 4, 1979

Related U.S. Application Data

[63] Continuation of Ser. No. 827,339, Apr. 7, 1978, abandoned.

[51] Int. Cl.$^3$ ................................................ F24J 3/02
[52] U.S. Cl. .................................... 126/430; 126/436; 126/428; 165/48 S; 165/104.17; 62/235.1
[58] Field of Search ............... 126/429, 430, 431, 436, 126/428, 165; 165/48 S, 49, 50, 47, 53, 104 S; 52/302, 303, 809; 62/2

[56] References Cited

U.S. PATENT DOCUMENTS

| | | | |
|---|---|---|---|
| 2,462,557 | 2/1949 | Santee | 165/49X |
| 2,559,870 | 7/1951 | Gay | 165/49 |
| 2,709,402 | 5/1955 | Malm | 52/302 X |
| 3,170,269 | 2/1965 | Dunnington | 52/302 X |
| 3,500,596 | 3/1970 | Andersson | 52/809 X |
| 3,897,820 | 8/1975 | Teeter, Jr. | 126/428 X |
| 4,000,851 | 1/1977 | Heilemann | 126/400 X |
| 4,051,999 | 10/1977 | Granger et al. | 126/400 X |
| 4,139,321 | 2/1979 | Werner | 126/400 |
| 4,173,304 | 11/1979 | Johnson | 126/400 X |

*Primary Examiner*—Larry Jones
*Attorney, Agent, or Firm*—Pollock, Vande Sande & Priddy

[57] ABSTRACT

This includes means and methods of keeping a heavily insulated shelter structure at a substantially even temperature night and day using only fueless solar energy to do so.

7 Claims, 4 Drawing Figures

HEATING AND COOLING OF A HEAVILY INSULATED BUILDING THROUGH THE USE ONLY OF SOLAR ENERGY

This is a continuation of application Ser. No. 827,339, filed Apr. 7, 1978, now abandoned.

BACKGROUND OF THE INVENTION

The present invention relates to a heavily insulated shelter structure having means for collecting and storing solar heat; means for liberating stored solar heat from said structure and cooling same; means for moving heat into and out of the fueless heat storage within said structure; and the cooperative combination of automatically and continuously accomplishing all three methods within said shelter structure to maintain the internal temperature of said structure at a constant level regardless of external seasonal temperatures.

Modern heating and cooling systems of the closed loop refrigerant type operate at pressures from 100 psi to 250 psi.

In comparison, the present invention operates at pressures far below 100 psi and for this reason is especially advantageous since the cost of piping, fittings and materials can be proportionally reduced.

It is noted that 40 to 60 psi is about the fluid pressure of the fauset pressure of the normal house water system.

Constant temperature control of the heated and cooled mass materials in a building formed as in the present invention is accomplished by a non-electric thermostatically operated group of valves that work together to control the movement of the working fluid in the by pass lines.

By pass valves allows a working fluid refrigerant such as $SO_2$ gas to migrate to the lowest pressure section of the system, thus preventing unwanted heat transfer throughout the interior of the structure. The complete and accurate heating and cooling of a heavily insulated building without using electricity, pumps, or any source of energy other than solar heat is the combined result.

For the past 50 years man has invented new and different ways of collecting solar energy for heating. Most of the previous systems designed for collecting solar heat require electric motor driven pumps and water with or without anti-freeze chemical as the working fluid. To date there has been little or no success in obtaining cooling from the sun.

For example, a Dr. Farber of Florida has mixed ammonia with lithium bromide in an absorption system. However, these systems are very heavy and cumbersome to manufacture, deliver and install and must be built with all ferrous metals. Running in a coolish mode they are known to be only 25 percent efficient.

Solar heat collecting systems at their best have been plagued with losses, mechanical problems and maintainence. Some times the cost of electrically operating the pump is greater than the solar energy benefit received. Prior to the work of the present inventor, no one to the knowledge of the inventor has been able to move heat vertically downward direction and return the refrigerent carrying fluid to a vertically upper level (or DESCRIPTION OF THE DRAWINGS All figures show a heavily insulated shelter structure in central cross section with bottom floor, walls, and ceiling made of the same materials and in the same manner. They are composed of panels of strong rigid foam poured between two thin skins. In particular;

DETAILED DESCRIPTION OF THE PREFERRED EMBODIMENT

Figure 1:
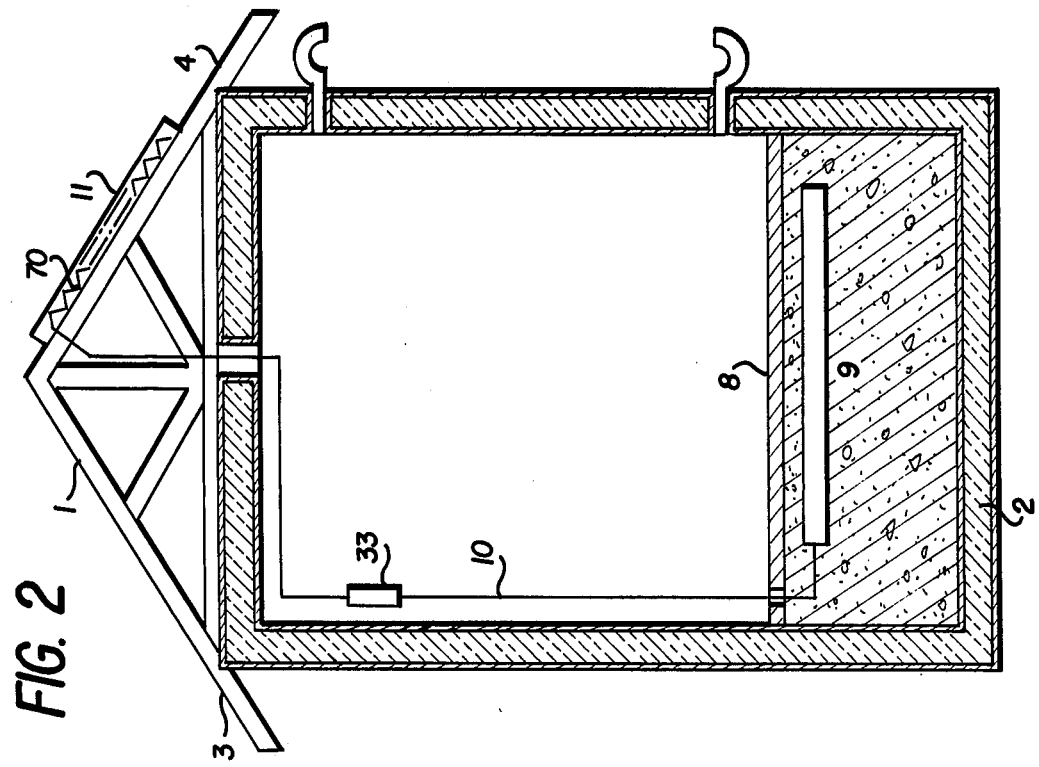
FIG. 1 shows means and methods of how I collect and store solar heat within my shelter structure.

During the cold winter months an internal temperature in the shelter structure of approximately seventy degrees Fahrenheit is desired. During the hot Summer months it is desired that a similar temperature also be automaticly maintained.

For purposes of explanation only the working fluid used either as a liquid or a vapor in all equipment is $SO_2$ which functions as a conventional refrigerant capable of boiling at temperatures considerably less than the boiling temperature of water.

During all four seasons the inventive concept here is to have the shelter structure automatically maintain this same summer-winter temperature by the way the $SO_2$ refrigerent is caused to flow through the various apparatus circuits always maintaining the proper temperature equilibrium inside the shelter structure itself.

In the figures shown in the drawings, the numerals are attached to apparatus as follows: The shelter structure itself is 1, is bottom floor is 2, all four side walls are 22, the ceiling is 32, held up by girder 3 which in turn sustains roof 4. Between bottom floor 2 and wooden floor 8 is temperature storage chambers 55 filled with either sand or fine gravel 60, that can be cooler than the internal temperature of the structure (shelter structure) in the summer and can be warmer than the internal temperature of the shelter structure in the winter.

Any shelter structure capable of performing as in the present invention must do so without relying in any way for outside fuel or power (for temperature maintainence) and is known as a zero-energy shelter structure.

In order to warm the interior of the shelter structure 1, solar heat is supplied by means of the $SO_2$ infrigerent in solar heat collector 5. The $SO_2$ thus warmed by the sun leaves solar heat collector (positioned on the outside of the building, on its south side and under roof overhang 3), enters the structure through tube 6 and solar heat storage tube 7 located in sand or gravel 60 in space 55. Within heat storage tube 7 tube 6 becomes a spiral almost to the end of tube 7. Here there is a short distance between the end of tube 6 and the end of heat storage apparatus 7. In tube 6 is a unit 34 to control the flow of $SO_2$ through tube 6 at all times.

Floor 8 is a wooden floor over sand or gravel bank 60 of chamber 55.

Sickel shaped tubes in the side wall bearing numerals 19 and 30 are barometric breathing tubes to provide internal air changes proportional to the seasons.

If the solar heat collector 5 is supplying more heat than is needed to maintaining a 70 degree temperature within the shelter structure 1 the flow of the $SO_2$ is either diminished or stopped by flow controller 34, in tube 6.

These elements are all shown in FIG. 1.

Figure 2:
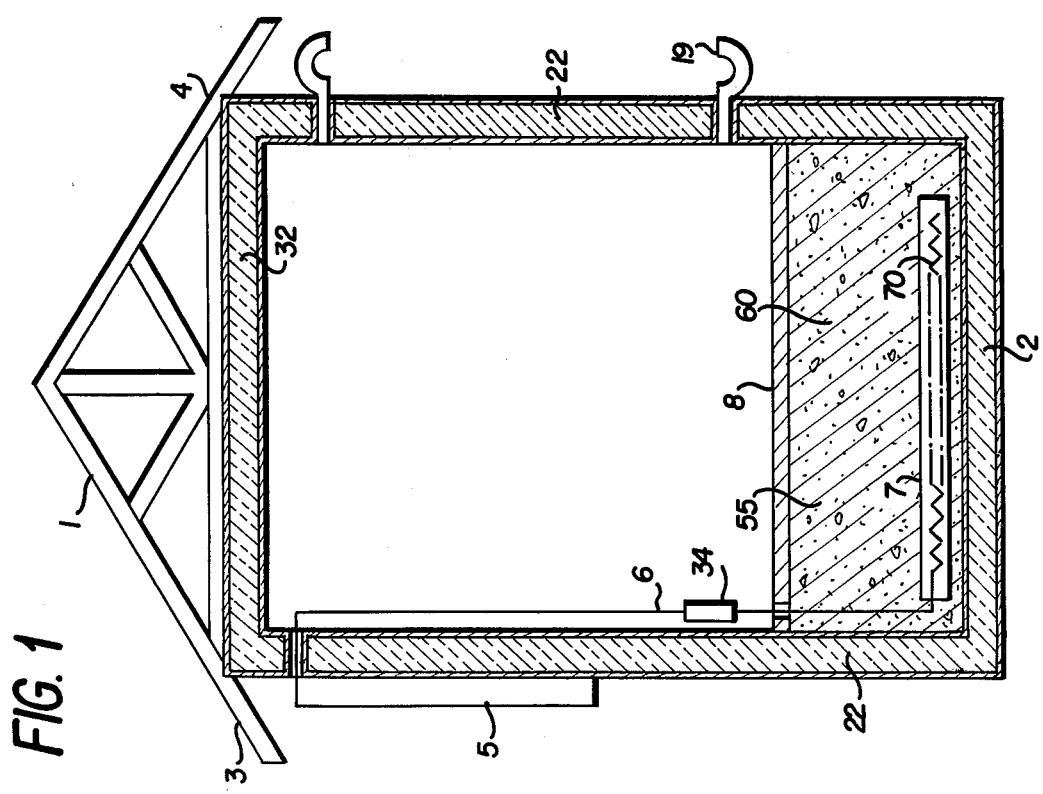
FIG. 2 shows means and methods of how I expel stored solar heat from said shelter structure thus cooling same.

In FIG. 2 numeral 11 indicates a roof mounted air conditioner which is connected via a tube 10 to $SO_2$ container 9. In a manner similar to container 7 the portion of tube 10 extending within the container 9 is spiralled almost, but not quite to the end of the container 9. Container 9 is located within the chamber or bank 60 including sand or fine gravel 55. The main purpose of air conditioning unit 11 resting on roof 4 is to reject heat from the interior of shelter structure 1. Within tube 10 is $SO_2$ flow controller 33. If insufficient heat is being rejected from the shelter at air conditioner 11, flow controller 33 increases the flow of $SO_2$ refrigerent in tube upward thus helping to maintain the summer-winter interior temperature of 70 degrees Fahr within the shelter structure at all times.

Figure 3:
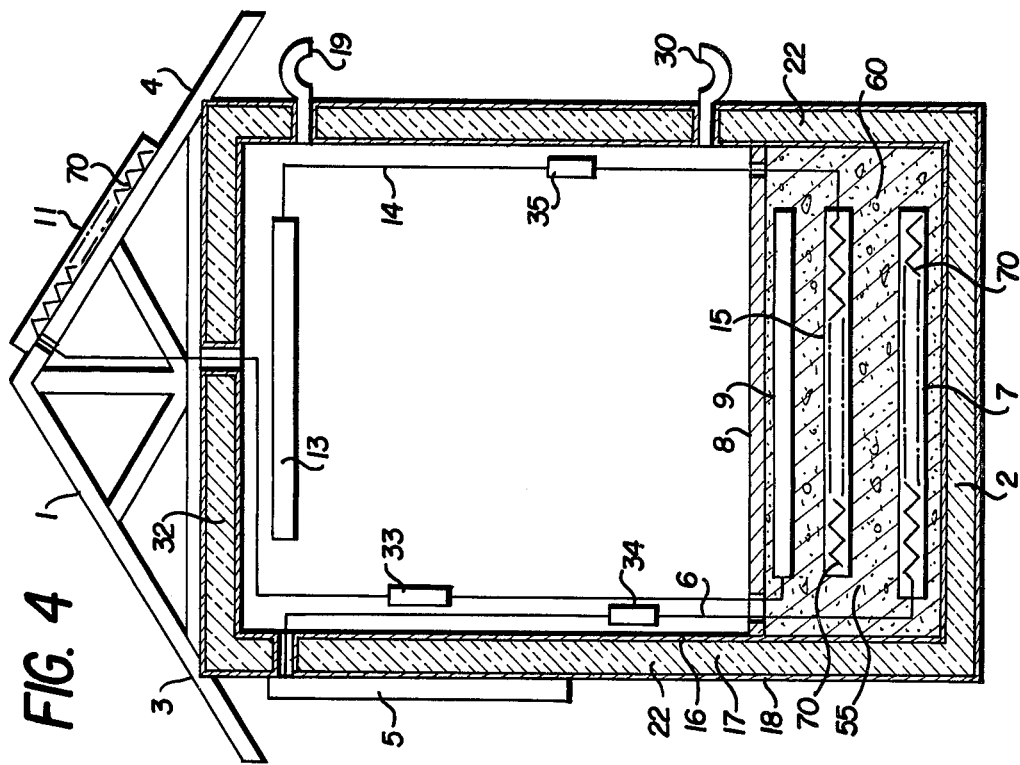
FIG. 3 shows means and methods of moving stored solar heat within said shelter structure.

In FIG. 3 the numeral 13 shows the internal heat distribution unit for distributing heat or coolness throughout the interior of shelter structure 1. The building and the system function in unison to balance the annular temperature of the internal sand or gravel mass 55. The sand mass acts as a solarbank or battery by storing heat energy and moisture for humidity. The stored energy becomes an overpowering influence on the air temperature and the humidity within the shelter structure. The CAPelators or the sickel shaped breathing tubes provide internal air changes according to the seasons. The three $SO_2$ infrigerent systems working in tune with the breathing tubes and the solarbank (or sand or gravel mass) provide for the first time in history (heating, cooling or air conditioning history), total environmental comfort.

This zero energy shelter structure was the first building known to the inventor as being able to provide relative humidity through the winter months without using a high operating cost humidifier.

Figure 4:
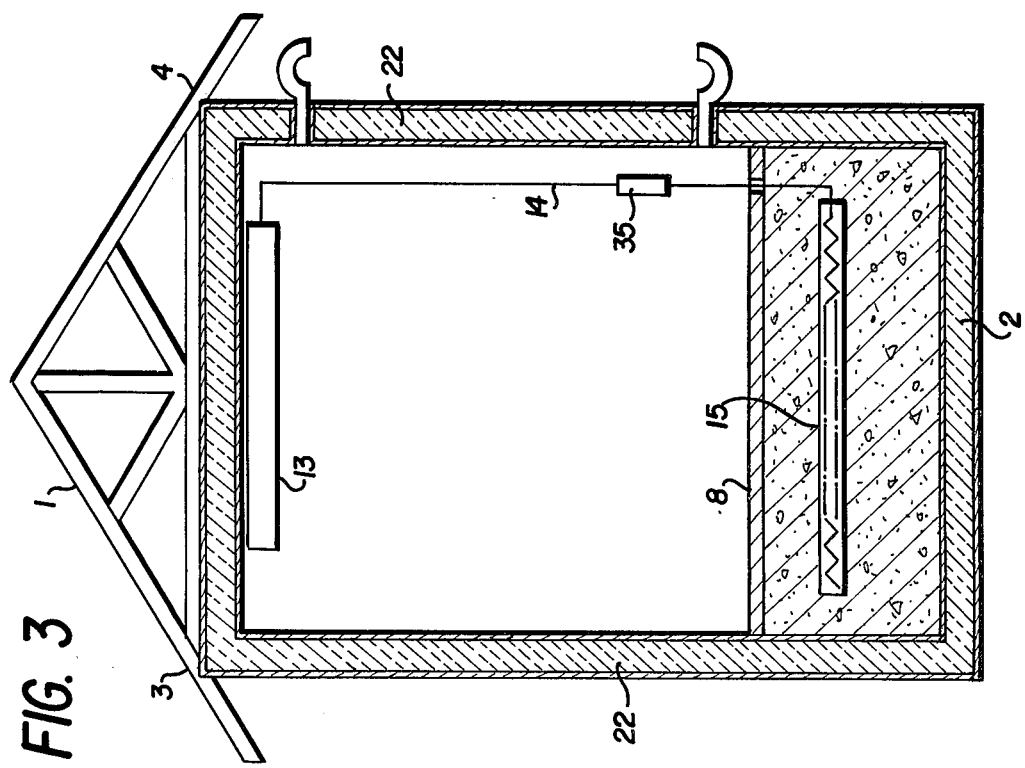
FIG. 4 shows means and methods of causing the cooperative action shown in FIG. 1, FIG. 2 and FIG. 3 to automatically work together to accomplish the maintainence of a constant uniform temperature within said building regardless of any seasonal temperature as it may exist outside said structure.

The three systems working together and using $SO_2$ as their liquid or vapor working fluid are shown in all detail in FIG. 4.

In FIG. 3 can be seen heat distributor 13 connected by tube 14 to container 15 in the solar bank 55. Flow controller 35 controls the flow of $SO_2$ in tube 14.

The same spital of tube 14 inside of container 15 as has been described with reference to the internal tube practice in containers 7 and 9 likewise here obtains, as does the flow controller 34 and the flow controller 33 does in tubes 6 and 10 respectively.

In the drawings it will be noted there is no pump moving $SO_2$ here or there throughout the structure. My copending patent application titled, "moving heat downwardly" and later issued as U.S. Pat. No. 4,089,366 is hereby incorporated into the present application by reference thereto. The issued U.S. Pat. No. 4,089,366 explains how $SO_2$ as a self moving working fluid is able to avoid such mechanism in achieving the above desired ends.

The solar heating and cooling system that I have invented is altogether new and different for the following reasons. . . .

First, it does not require any electrical devices, wiring thermostats or antisipators.

Second, it does not require maintainence. Its life is indefinitely long, in most cases longer than the building in which it is installed.

Third, it runs with a mechanical working fluid which is a by product of carbon fuel energy production called $SO_2$ (or sulphur dioxide).

Fourth, this mechanical working fluid $SO_2$ operates in a hermetically sealed system of circuits in a super anhydrous condition.

Fifth, so that the sulphur dioxide is able to stay in the dioxide state for an absolutely indefinite length of time.

The system is best described as an all seasons solar energy temperature leveling system. The heat collectors and the heat rejectors work in unison to bring about and cause a comfortable living condition inside the habitate or heavily insulated shelter structure.

In the winter for instance solar radiation coming in at a low asmath angle reaches below the extended eves on the south side of the roof of the structure. Inside the solar heat collector 5 to $SO_2$ boils into vapor (or steam) and leaves by pipe 6 and travels to heat rejecter 7 in the solarbank 60. Upon reaching the heat rejector tank 7 the $SO_2$ steam passes through a helixal tube 70 that is wound about the inside of rejector 7 in such a way as to be in conductive contact with the outer wall of the heat rejector case 7. Sulphur dioxide as a liquid condenses in this heat rejector tank 7 and stays there until the outside temperature of the collector 5 drops in temperature, causing a differential pressure to form a suction which pulls the $SO_2$ in its liquid state back up into solar heat collector wherein it is ready at daylight to boil back into steam (or vapor) to again accomplish the aforementioned downward motion.

It is interesting that the $SO_2$ in vapor form has an enthraphal value of 270 BTus for each pound transmitted. Only the specific heat is carried back to the collector 5. The return loss is only the specific heat of the $SO_2$ in liquid form which is 0.34. So we have sulphur dioxide going into the building as a working fluid carrying 270 BTus per pound and coming out of the building with a loss of only 0.34 pound on its return to the solar heat collector.

Going from FIG. 1 to FIG. 3 it is noted that previous to the work of the present inventor no means has ever been available to move heat down from a ceiling in a building to the floor because heat tends to lay in a stratofied level in a still air situation with a gradient temperature very high at the ceiling and much lower at the floor.

In FIG. 3 of this system, heat collected at the ceiling in heat collector 13 moves to heat ejector 15 acts in the same way as collector 3 and heat rejector 7 previously mentioned works.

So we have for the first time without the use of a fan, electric motors and pumps, a method of driving or moving heat from the ceiling to the floor or in this case to the storage medium wherein it is rejected. This happens in this way. Sulphur dioxide boils in 13 at the rate of 185 Btus per pound, basic heat of vaporization. It travels from heat collector 13 down through tube 14 to heat rejector 15. On entering heat rejector tank 15 is passes through condenser tube inside 15 where it is rejected to the sand 60. During the cool of the night heat collector 13 drops in temperature and the differential pressure draws $SO_2$ from heat rejector tank 15 via line (tube line) 14 back to heat collector 13 where it readies itself for recycling on the next hot day.

In FIG. 2 the next $SO_2$ refrigerent circuit works to eject heat in excess of the amount required for human comfort in the shelter structure. This is a cooling system. The systems described in FIG. 1 and FIG. 3 are heat collectors. This is a heat rejector and it works this way.

Excess heat in the solarbank 60 causes $SO_2$ in heat collector 9 to boil. The $SO_2$ vapor moves to the roof heat rejector 11 by pipe 10. Upon reaching the heat rejector 11 the $SO_2$ condenses and gives off its heat to the night sky. This can happen during the day or the night or at any time when the outside temperature is below the solarbank 60 temperature. The heat increase around the rejector and in the sky or the first rays of the morning sun striking the surface of the rejector 11, this increases its temperature thus its pressure. Since this differential pressure is now greater than the pressure in the heat collector 9 finds the $SO_2$ carrying only 0.34 back through condenser pipe line 10 and back down hill to heat collector 9 where it rests until such time when excess heat is available to boil it back off to the sky.

This total cycle system offers man his first opportunity to level the seasonal temperature so that a building internally might be cooled and heated in an annual cycle temperature level.

The six sided building has a continuous block of foam surrounding all six sides so there is little heat loss or heat gain that can support heat transfer from the solarbank 60 other than through the control device mentioned. In this scheme the solarbank acts as a battery to store solar heat. Its mass in relation to air volume is the dominant force.

Not only does solarbank store heat. It also acts as an absorber to draw in and hold atmospheric moisture. Operating as a humidifier it acts in conjunction with the breathing tubes 19 and 30 to absorb moisture on the increase of vapor pressure inside the building. In much the same way a sponge reacts to moisture. The humidity level in this house (or building) never has to be mechanically increased, since the water in the house reacts in a total life cycle much the way moisture in a terrerium cycles moving back and forth from the solarbank to the surrounding air. In this way the building for the first time is able to operate for the first time without the need of artificial mechanical humidification. As in a terrerium the moisture is always there either in the sand, where on a reduction in humidity, it leaves the sand, to supply the air system. This I claim is a new happening in that no building known to the inventor has ever operated at 50 percent relative humidity without highly sophisticated controls and mechanical humidifiers. Then (under mechanical humidification) the air wetting action would be too great for the hydroscopic properties of the building's heat insulation.

All buildings in the past have responded to the laws of the psychometric chart. The shelter structure described herein responds to a new principle based on Daltons findings. . . "the law of partial pressures." Briefly stated the vapor pressure exceeds a certain point where moisture in the air stratofies into densitity levels and seeks a density equal to its new pressure at colder area where it can return for rest in its denser condition.

In this way the air above the solarbank working in conjunction with the barometric aspirators 19 and 30 are able to fulfill all the remaining functions. Created for the first time is a perfect atmosphere within a six sided shelter structure capable of working at any latitude using the forces that are materially available other than those which are man made.

I claim:

1. An assembly for maintaining a substantially constant living temperature in a shelter of the type defined by a plurality of highly insulated side walls extending partially beneath ground and partially above ground and joined at one end by a basement floor of highly insulative material and at an opposite end by a ceiling of highly insulative material with a floor extending between said side walls to divide said shelter into a subterranean area containing a heat storage material and separate area adaptable for human occupation located substantially above said subterranean portion and in heat transfer relationship therewith, comprising:

said shelter having a roof extending above said ceiling and joining said plurality of said walls, with at least one solar heat collector assembly mounted on said roof and facing outwardly from said shelter;

at least one heat collector assembly located adjacent to a surface of said ceiling defining said separate area;

each of said heat collector assemblies including at least one heat conductive conduit mounted therein adaptable for receiving a quantity of a working refrigerent fluid capable of boiling when subjected to a source of heat such as solar rays striking said heat collectors;

a plurality of separate container assemblies each positioned within said heat storage material located in said highly insulated subterranean area of said shelter;

each of said container assemblies including at least one heat conductive conduit adaptable for receiving working refrigerent fluid with each conduit being in heat transfer relationship with a portion of said heat storage material;

separate connector means providing a fluid passageway directly between a circuit mounted in a heat collector and a conduit mounted in a container assembly for reversibly transporting a quantity of said working refrigerent fluid therebetween.

2. An assembly according to claim 1, wherein said highly insulated side walls and said highly insulated material comprises a rigid plastic foam material positioned between two rigid and flat skins.

3. An assembly according to claim 1, wherein said heat storage material includes a quantity of sand.

4. An assembly according to claim 1, wherein said heat storage material includes a quantity of gravel.

5. An assembly according to claim 1, wherein said refrigerent working fluid comprises a separate quantity of $SO_2$ positioned within each fluid passageway formed by one of said connector means and a pair of conduits attached at opposite ends and mounted in one of said heat collectors and one of said container assemblies; respectively.

6. An assembly for maintaining a substantially constant living temperature in a shelter of the type defined by a plurality of high insulated side walls extending partially beneath ground and partially above ground and joined at one end by a basement floor of highly insulative material and at an opposite end by a ceiling of highly insulative material with a floor extending between said side walls to divide said shelter into a subterranean area containing a heat storage material and separate area adaptable for human occupation located substantially above said subterranean portion and in heat transfer relationship therewith, comprising:

said shelter having a roof extending above said ceiling and joining said plurality of side walls, with at least one solar heat collector assembly mounted on said roof and facing outwardly from said shelter;

said heat collector assembly including at least one heat conductive conduit mounted therein adaptable for receiving a quantity of a working refrigerent fluid;

a container assembly positioned within said heat storage material located in said highly insulated subterranean area of said shelter;

said container assembly including at least one heat conductive conduit in heat transfer relationship with a portion of said heat storage material;

connector means providing a fluid passageway directly between said conductive conduit mounted in said heat collector assembly and said conductive conduit of said container assembly for reversibly transporting a quantity of said working refrigerant therebetween.

7. An assembly for maintaining a substantially constant living temperature in a shelter of the type defined by a plurality of highly insulated side walls extending partially beneath ground and partially above ground and joined at one end by a basement floor of highly insulative material and at an opposite end by a ceiling of highly insulative material with a floor extending between said side walls to divide said shelter into a subterranean area containing a heat storage material and separate area adaptable for human occupation located substantially above said subterranean portion and in heat transfer relationship therewith, comprising:

at least one solar heat collector assembly mounted on an exterior side wall surface and facing outwardly from said shelter;

said heat collector assembly including at least one heat conductive conduit mounted therein adaptable for receiving a quantity of a working refrigerent fluid;

a container assembly positioned within said heat storage material located in said highly insulated subterranean area of said shelter;

said container assembly including at least one heat conductive conduit in heat transfer relationship with a portion of said heat storage material;

connector means providing a fluid passageway directly between said conductive conduit mounted in said heat collector assembly and said conductive conduit of said container assembly for reversibly transporting a quantity of said working refrigerent therebetween.

* * * * *